C. GRIÈRE.
PROCESS FOR DIRECTLY CONVERTING SUGAR SYRUPS INTO CRYSTALLIZED SUGAR OF AGREEABLE TASTE.
APPLICATION FILED MAR. 17, 1909.
988,261.
Patented Mar. 28, 1911.
2 SHEETS—SHEET 1.
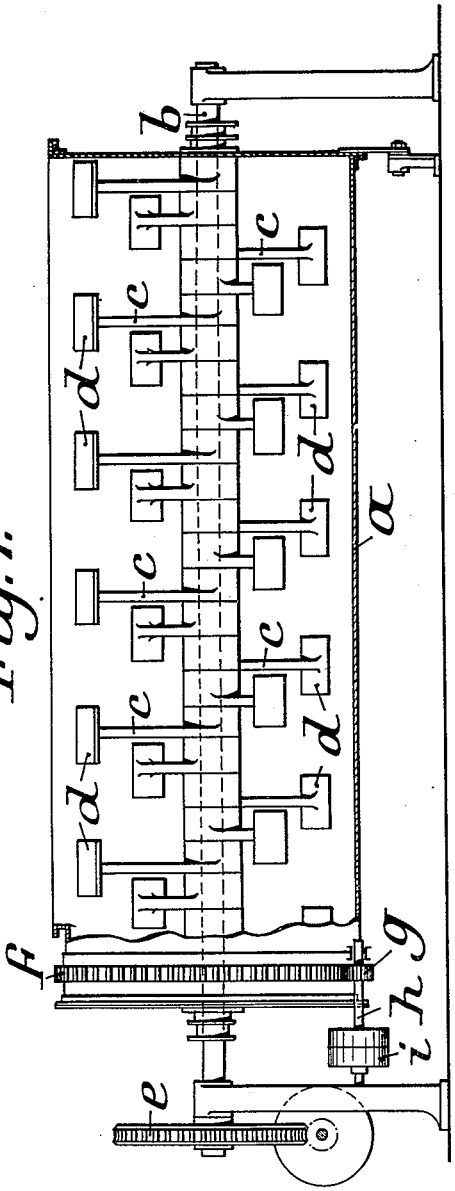
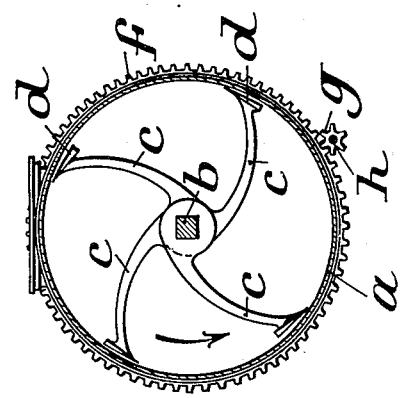
WITNESSES
INVENTOR
Charles Grière
ATTORNEYS C. GRIÈRE.
PROCESS FOR DIRECTLY CONVERTING SUGAR SYRUPS INTO CRYSTALLIZED SUGAR OF AGREEABLE TASTE.
APPLICATION FILED MAR. 17, 1909.
988,261.
Patented Mar. 28, 1911.
2 SHEETS—SHEET 2.
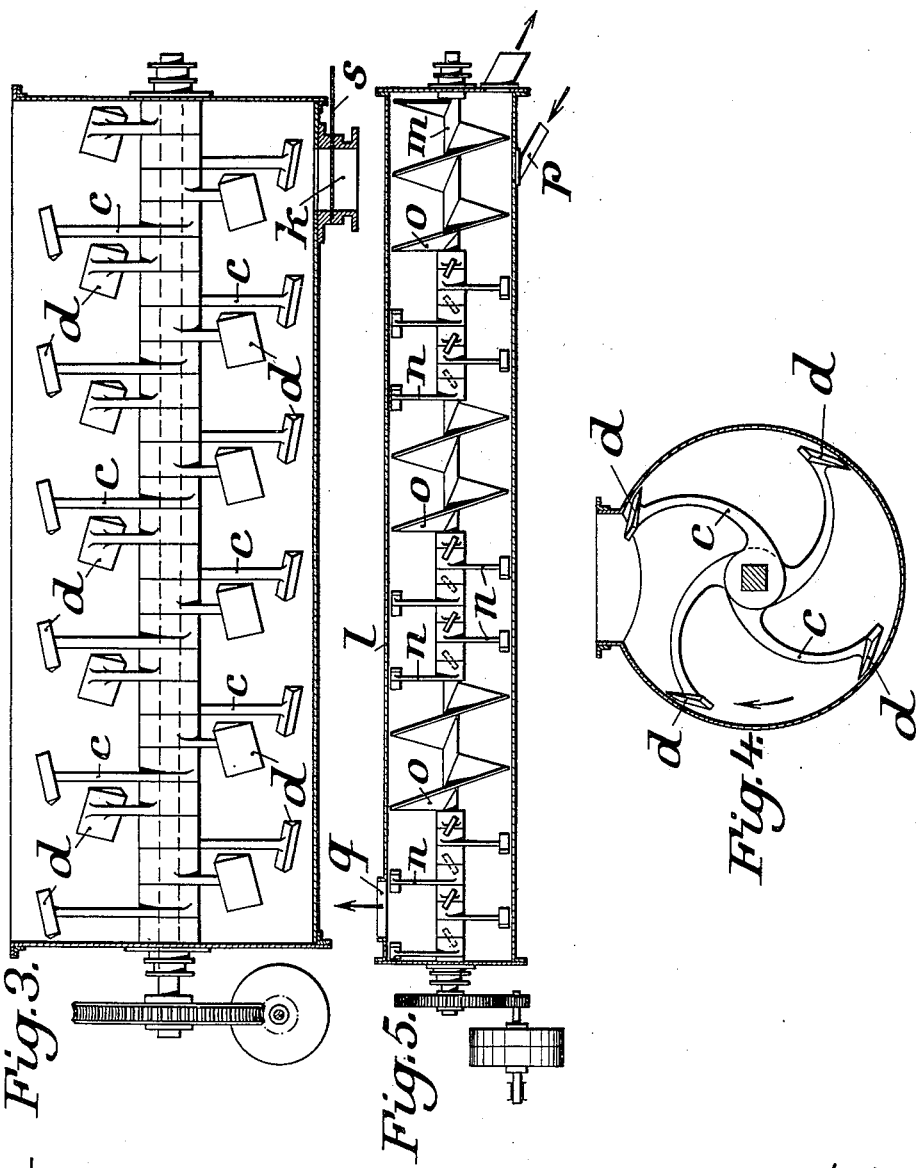
WITNESSES
INVENTOR

UNITED STATES PATENT OFFICE.

CHARLES GRIÈRE, OF GREVENBROICH, GERMANY.

PROCESS FOR DIRECTLY CONVERTING SUGAR SYRUPS INTO CRYSTALLIZED SUGAR OF AGREEABLE TASTE.

988,261.   Specification of Letters Patent.   Patented Mar. 28, 1911.

Application filed March 17, 1909. Serial No. 484,023.

*To all whom it may concern:*

Be it known that I, CHARLES GRIÈRE, engineer, a citizen of the French Republic, residing at 23 Rheydterstrasse, Grevenbroich, Germany, have invented certain new and useful Improvements in Processes for Directly Converting Sugar Syrups into Crystallized Sugar of Agreeable Taste; and I do hereby declare the following to be a full, clear, and exact description of the invention, such as will enable others skilled in the art to which it appertains to make and use the same.

My invention relates to a process by which beetroot sugar such as is obtained in a rough state in sugar factories may be given an agreeable taste and smell similar to that of cane sugar and also to convert the raw sugar into different varieties of crystallized sugar such as powdered sugar, grain sugar and clayed sugar or cassonade in the simplest and most economical way.

In carrying out the process, I may, for instance, boil down a solution of sugar which may be more or less pure but is preferably of a high degree of purity, at atmospheric pressure in a comparatively short time to such an extent that its boiling point is raised to from 120–130° C. The sugar solution is then run off into a mixing tank of any suitable shape and a determined quantity of crystallized sugar of the fineness desired in the finished product added. As much as 50 to a 100% or even more of crystallized sugar may be added to the solution. In a few minutes crystallization will ensue and owing to the action on the water contained in the mass, of the heat induced or generated by the crystallization, the mass will start to give off steam, and a paste of moist sugar of from 70° to 80° C. will be formed. Then the contents of the mixing tank are transferred into a second tank where the mass is still further stirred. From this tank the sugar is fed slowly into a feeding screw of special construction. This feeding screw has a rapid motion and a current of cold air is sent through the mass as it passes through the screw. The sugar issues from the screw as a dry powdery mass and is then passed through a screen. It is to be understood that although this air is referred to as cold, it only needs to be cooler than the paste, and it may be somewhat warmer than the ordinary or usual temperature in which the operations are carried on.

If, as in the case described, the syrup is boiled down at atmospheric pressure and also if the boiling has been at first carried on in a vacuum, it is absolutely necessary to carefully prevent the boiling solution from coming into contact with the surrounding atmosphere. This is done by continually maintaining a layer of steam over the boiling syrup. In this case, the evaporation receptacle is provided with a suitable cover and the steam is maintained in the space between the surface of the solution and the said cover, so that no air can have access to the solution. Owing to this precaution the sugar is not decomposed and the product does not show the coloring and the disagreeable odor consequent on such decomposition, but on the contrary a favorable change is produced in the finished product. The high temperature of about 125° C. acting during a short period of time, and also the subsequent treatment, gives the sugar a characteristic smell and taste without changing its color. Beetroot sugar may in this manner be given an odor and taste similar to that of cane sugar.

The complete crystallization of the already highly oversaturated solution on the addition of powdered sugar is a physical phenomenon which is not dependent on the stirring of the mass, but is brought about by the fall in the temperature of the solution consequent on the addition of the sugar, and by the dry sugar absorbing a large quantity of the water of the solution. The mass is stirred only to distribute the materials as equally as possible. It is not necessary to heat or cool the mass further during the process. The initial heat of the solution is sufficient. If the stirring tank should be subjected to any strong cooling influence it should preferably be protected by a casing. The mass in the mixing tank should not be allowed to cool down too far or to lose too much water.

The mass should be kept in a pasty state, since, if it becomes too dry, hard lumps of sugar are formed, which will not pass through the screen and which occasion a large quantity of waste. The crystallized sugar is finally dried by a current of cold air blown into the feeding screw aided by the mechanical action of the screw itself.

A process is known according to which powdered sugar may be obtained by strongly agitating a sugar solution boiled down to 120° C. by means of a rapidly moving stirrer. This process is in accordance with the known properties of highly concentrated sugar solution heated to a high temperature. In my process I utilize the properties of certain solutions known in chemical science in a new manner. I divide the operation into two well defined phases: first, the production of a paste of sugar crystals; and second, disintegration and drying of that paste to produce crystallized sugar. By this means I am enabled to carry out my process with a high degree of exactitude and to regulate to a certain degree the size of grain of the product obtained. It is of great importance to keep the hot and moist sugar paste in the mixing tank homogeneous and this is greatly facilitated by the possibility of working at a determined temperature in a certain time and with an exactly determined quantity of material. The conversion of the paste into dry powdered sugar is also rendered simpler and more exact according to the present process as it is possible to regulate singly each of the three agents, namely, the temperature of the sugar paste, the action of the screw, and the air current.

In practice the sugar syrup is boiled down in a vacuum pan such as is used in sugar factories. In order to accelerate this operation, a vacuum is maintained in the pan and it is gradually reduced so that the solution never becomes supersaturated to such a degree as to produce granulation. Finally the vacuum valve is closed altogether and the air valve opened. The concentrated solution is then run into a mixing tank preferably of small diameter and the crystallized sugar added in predetermined quantity. As a part of this sugar there may be employed all the waste sugar of the factory, the lumps that remain on the screen, the sugar from the dust chamber, etc. It is possible to determine to some extent the size of grain of the sugar obtained by the manner in which the addition is made. If the quantity of sugar added is small and the mixture is stirred for a comparatively short time few crystals are formed and these grow to some size. If however a large quantity of sugar is added small crystals in great quantity are the result.

For mixing the sugar and the syrup I preferably employ two distinct devices, the one adapted to mix the ingredients and the other to knead the paste thoroughly. For both purposes I may employ any form of mixing apparatus known in the manufacture of sugar and other industries. It is however important that the mixing arms continually scrape along the walls of the tank as the paste has a tendency to harden and adhere strongly to the walls when it grows cold. I therefore fit the mixing arms with scrapers. I may also carry out both operations in the same mixing apparatus if desirable.

The air current may act on the paste as a counter current and in this case the air is introduced under pressure at one end of the screw and leaves it by an opening placed close to the opening by which the paste is fed into the screw, or it may be introduced into the screw from both ends and leave it in the middle.

Instead of adding a certain quantity of sugar or waste to the concentrated syrup, crystallization may also be brought about by evaporation of a certain amount of water from the syrup. In this case the mixing tank must be closed. The syrup is run in and a vacuum produced in the tank. The syrup immediately begins to crystallize. As in the case above described crystallization is accompanied by the generation of steam and this phenomenon may be utilized to determine within certain limits the size of the grain obtained. If at first only a small amount of the water in the syrup is allowed to evaporate and the tank is then opened and crystallization allowed to proceed under atmospheric pressure and stirring, comparatively few crystals, of larger size will be formed. If however sugar of a finer grain is desired, crystallization is brought about as before and then the pressure lowered more and more till crystallization is complete.

In the first case the sliding valve of the vacuum is opened for a few minutes so that only a few centimeters minus pressure is produced in the tank and the valve again closed. It may then be easily seen on opening a small cock on the tank by the steam issuing from it that over pressure has taken the place of the vacuum. This is a sign that crystallization is beginning. The grain grows rapidly and the vacuum valve may soon be again opened.

In the second case the sliding valve is opened gradually so that the pressure is gradually lowered. The operation is finished in from 10 to 15 minutes accordingly as the sugar is desired more or less moist. In case a second mixing tank is used evaporation may be so conducted as to obtain a paste of the same degree of viscosity and temperature as when working by addition of waste sugar. The paste is then treated as before described. If the mass is kept a little longer under the influence of the vacuum it begins to disintegrate in the tank and a moist sugar of 60° to 70° C. is obtained. It is perfectly useless and even detrimental to cool the sugar still further and in any case the sugar must not be allowed to become too dry as big lumps are thereby formed which will not pass the screen and increase the amount of waste. It is not necessary to establish a high vacuum in the tank, an ordinary low pressure from 55 to 60 cm. is quite sufficient and even preferable. The moist sugar which leaves the mixing tank according to the above described manner of working may be dried by the same form of feeding screw as the above mentioned paste.

Both these modifications of my process have this in common that they begin by converting highly concentrated and heated sugar solution into a moist paste of crystallized sugar by depriving it of part of its water either by evaporating part of said water or by adding a determined quantity of dry sugar and at the same time lowering the temperature of the solution. The moist and heated paste of crystallized sugar is in both cases converted into dry powdered sugar by treating it with a current of air which absorbs the rest of the water and cools the mass still further.

The advantage of the present process over other similar methods of preparing powdered sugar or converting filling masses into dry crystallized sugar is its simplicity, the certainty of attaining the desired result and the ease with which the different operations may be controlled. The present process also saves labor and fuel.

It is evident that the two modifications described may also be combined to form a third modification. To do this I add a smaller quantity of sugar to the solution than I would in working according to the first method and then lower the pressure but not as much as is necessary for carrying out the second method. This manner of working produces the same results as the above mentioned modifications.

The present process is especially designed for treating beetroot sugar but it may of course be also used to convert cane sugar syrups into crystallized sugar. In case of cane sugar syrup being employed it would be useless and even dangerous to boil the syrup down to so high a boiling point. It is preferable to employ syrup of a lower temperature and add more dry sugar or allow the vacuum to act a few minutes longer. It is further evident that the above described results may also be obtained from beetroot sugar syrups of lower temperature than 125° C. and in case it is not desired to modify strongly the smell and taste of the finished product it will not be necessary to boil down the syrup to that extent.

In the accompanying drawing, Figure 1 is a longitudinal section of a mixing tank adapted for use in carrying out the improved method, Fig. 2 is a transverse section through the tank, Figs. 3 and 4 are a longitudinal section and a transverse section, respectively, of a mixing tank of modified form, and Fig. 5 is a longitudinal section through a feeding screw through which drying air is passed.

The mixing tank (Fig. 1) consists of a barrel shaped trough $a$ open at the top and fitted with a shaft $b$. The shaft is provided with stirring arms $c$ which carry horizontal scrapers $d$. The shaft is rotated by a worm gear $e$. The trough $a$ may be rocked by means of a spur gear $f$ geared by the cogwheel $g$ to the shaft $h$ and pulley $i$.

If it is desired to work under reduced pressure in the trough $a$ it should be fitted with a cap, pipes connecting it to the air pump and an air valve.

The second mixing tank (Figs. 3 and 4) is similar in construction to the first the only difference being that no arrangement is made for rocking the tank. The scrapers $d$ are inclined against the axis of the shaft and feed the pasty mass toward the discharge opening $k$ which may be closed by a door $s$.

Instead of these two forms of mixing tanks one single tank may be employed which should then be fitted with mixing and kneading arms. The feeding screw (Fig. 5) consists of a closed cylindrical trough $l$ in which a shaft $m$ rotates. This shaft carries stirring arms $n$ and alternating with these spiral screw blades $o$ which may be full or composed of strips of metal. The current of air is introduced through an opening $p$ near the discharge opening and leaves the screw through the feed opening $q$ but it may also be introduced at both ends of the screw and discharged in the middle of the screw. The motion of the screw is rapid. The trough of the screw should not be more than partly filled.

Instead of the screw described any other suitable device adapted to agitate and feed the pasty material may be used.

What I claim is:

1. A process for converting sugar solutions into crystallized sugar, which comprises evaporating a solution, then lowering the temperature thereof and the relative water content, to cause substantially all of the sugar in the solution to separate out at a single operation, and then drying and disintegrating the pasty mass resulting from the aforesaid operations; substantially as described.

2. A process for converting sugar solutions into crystallized sugar, which consists in converting a highly heated and concentrated solution into a moist heated paste of crystallized sugar by reducing the relative water content of the solution and lowering the temperature thereof, and then converting such paste into dry fine sugar by agitating the paste and treating it with a current of relatively cold air which eliminates the remainder of the water content; substantially as described.

3. A process for converting sugar solutions into crystallized sugar, which comprises boiling down a solution to a certain extent, then, without further heating, causing substantially all of the sugar to crystallize out of the solution by lowering the temperature of the latter and decreasing the relative water content, whereby a moist warm paste of sugar crystals is formed, mixing and kneading the mass, and finally drying and disintegrating the same; substantially as described.

4. A process for the direct conversion of sugar solutions into more or less fine, dry sugar, which consists in boiling down the solution at a temperature from 120° to 130° C., reducing the relative water content of such solution and converting the same into a moist hot sugar paste of a temperature of about 70° C., and then subjecting such paste, in a suitable receptacle, to agitation and to the action of a blast of air passed through the same, to complete the elimination of the water content; substantially as described.

5. A process for the direct conversion of sugar solutions into more or less fine, dry sugar, which comprises the boiling down of the solution at a temperature of from 120° to 130° C., reducing the relative water content of the solution by adding thereto a quantity of loose dry sugar amounting to at least 50% of the solution, whereby a moist hot sugar paste is formed, and then subjecting such paste, in a suitable receptacle, to agitation and to a blast of air led through the same, to complete the elimination of the water content; substantially as described.

6. A process for the direct conversion of sugar solutions into more or less fine, dry sugar, which comprises boiling down the solution at a high temperature, corresponding to from 120° to 130° C., reducing the relative water content of the solution by adding thereto a quantity of loose, dry sugar, amounting to at least 50% of the solution, thereby forming a sugar paste of a temperature of about 70° C., and then agitating such paste in a suitable receptacle and passing through the same a blast or current of air to complete the elimination of the water content of the paste; substantially as described.

In testimony whereof I have affixed my signature, in presence of two witnesses.

CHARLES GRIÈRE. [L. S.]

Witnesses:
OTTO KÖNIG,
W. KLEIN.